US012775578B1

(12) United States Patent
Thomas et al.

(10) Patent No.: US 12,775,578 B1
(45) Date of Patent: Oct. 27, 2026

(54) SECURE SERIAL PERIPHERAL INTERFACE (SPI) STORAGE DEVICE

(71) Applicant: AMERICAN MEGATRENDS INTERNATIONAL, LLC, Duluth, GA (US)

(72) Inventors: Satheesh Thomas, Johns Creek, GA (US); Madhan B. Santharam, Cumming, GA (US); Brian Desmond Mullen, Peachtree City, GA (US); Balaji Nagalingam Rajendiran, Duluth, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 65 days.

(21) Appl. No.: 19/012,782

(22) Filed: Jan. 7, 2025

(51) Int. Cl.
*G06F 13/42* (2006.01)

(52) U.S. Cl.
CPC .. *G06F 13/4282* (2013.01); *G06F 2213/0012* (2013.01); *G06F 2213/40* (2013.01)

(58) Field of Classification Search
CPC ......... G06F 13/4282; G06F 2213/0012; G06F 2213/40; G06F 21/30; G06F 21/44; G06F 21/60; G06F 21/62; G06F 21/70; G06F 21/78; G06F 21/79; G06F 21/80; G06F 21/85
See application file for complete search history.

(56) References Cited

U.S. PATENT DOCUMENTS

| | | | | |
|---|---|---|---|---|
| 9,411,748 | B2 * | 8/2016 | Sarangdhar | G06F 12/1408 |
| 10,866,747 | B2 * | 12/2020 | Som | G06F 13/1668 |
| 2020/0192824 | A1 * | 6/2020 | Wang | G06F 21/44 |

* cited by examiner

*Primary Examiner* — Idriss N Alrobaye
*Assistant Examiner* — Richard B Franklin
(74) *Attorney, Agent, or Firm* — Newport IP, LLC; Leonard J. Hope

(57) ABSTRACT

A secure serial peripheral interface ("SPI") storage device is disclosed. The SPI storage device includes a memory and an SPI controller, which receives digitally signed commands on an SPI bus for performing various types of operations, such as operations for writing to or reading from the memory. The SPI controller can verify the signatures of a signed command using a public encryption key associated with a sender of the command. If the SPI controller can authenticate a signed command, the SPI controller performs the requested command. The SPI controller then returns a signed response to the signed command. The SPI controller can also perform integrity checking on data stored in the memory by computing and storing hash values for portions of the memory. The signed commands and signed responses can also be encrypted.

19 Claims, 13 Drawing Sheets

SECURE SPI STORAGE DEVICE AUTHENTICATED WRITE OPERATION

SECURE SPI STORAGE DEVICE AUTHENTICATED READ OPERATION

SOFTWARE BMC IMPLEMENTATION

HARDWARE BMC IMPLEMENTATION

HROT IMPLEMENTATION

SECURE SERIAL PERIPHERAL INTERFACE (SPI) STORAGE DEVICE

BACKGROUND

Embedded systems commonly utilize Serial Peripheral Interface ("SPI") storage devices for data storage. SPI is a bus standard that is commonly utilized to send data between microcontrollers and small peripherals, such as memory devices. SPI utilizes a high-speed, full-duplex protocol designed for simple and efficient data transfer.

As one example, computing systems commonly utilize SPI storage devices to store firmware and configuration data. These computing systems commonly utilize a secure boot architecture, whereby the firmware stored on an SPI storage device is validated at boot time. These computing systems do not, however, include functionality for validating data retrieved from an SPI storage device at runtime.

In contrast to secure boot architectures, zero trust architectures assume that no data can be trusted and, therefore, require validation of data stored on SPI storage devices at the time the data is used (i.e. at runtime). Current SPI storage devices cannot provide this functionality and do not, therefore, meet the requirements of zero trust architectures.

It is with respect to these and other considerations that the disclosure made herein is presented.

SUMMARY

A secure SPI storage device is disclosed herein. Through implementations of the disclosed technologies, a secure SPI storage device can provide various technical benefits such as, but not limited to, increased security as compared to existing SPI storage devices. Increased security can be achieved during runtime by authenticating read and write commands directed to the secure SPI storage device, performing integrity checks on data stored by the secure SPI storage device, encrypting data stored by the secure SPI storage device, and through other mechanisms. The disclosed secure SPI storage device can also provide technical benefits other than those specifically mentioned herein.

In one embodiment, a secure SPI storage device is configured to provide secure storage for a computing platform. The SPI storage device includes a memory, such as a non-volatile random-access memory ("NVRAM"), and a "smart" SPI controller. The SPI controller receives commands on an SPI bus for performing various types of operations. For example, and without limitation, the SPI controller can receive read and write commands during runtime of the computing platform for reading and writing data to and from the memory of the secure SPI storage device, respectively. In one embodiment, the commands are received from a baseboard management controller ("BMC"). The SPI controller can receive commands from other devices in other embodiments.

In embodiments, the commands received by the SPI controller include a digital signature (which might be referred to herein simply as "a signature"). In these embodiments, a sender, such as a BMC, transmits signed commands for performing operations to the SPI controller during runtime. For example, and without limitation, in various embodiments, a BMC can send a signed write command for writing data to the memory of the secure SPI storage device. The BMC can also send a signed read command for reading data from the memory of the secure SPI storage device. Other types of signed commands include commands for defining a portion of the memory upon which the SPI controller is to perform integrity checking and commands for erasing portions of the memory of the secure SPI storage device.

In response to receiving a signed command, the SPI controller authenticates the signed command. For example, and without limitation, the SPI controller can verify the signature of the signed command using a public encryption key associated with the sender of the command. If the SPI controller can authenticate the signed command, the SPI controller performs the requested operation. The SPI controller can then return a signed response to the signed command.

In an embodiment, the SPI controller computes and stores hash values for data stored in the memory. For example, and without limitation, the SPI controller can compute cryptographic hashes for portions of the memory following the performance of a write command and store the hash values. When a subsequent read command is received, the SPI controller can compute a new hash value, or values, for the portion of the memory to be read and compare the newly computed hash values to the previously computed and stored hash values. If the hash values are identical, then the SPI controller performs the requested read command. If the hash values are not identical, the SPI controller can return a signed response to the read command that indicates that an error occurred.

As discussed briefly above, the SPI storage device includes an NVRAM and an SPI controller in some embodiments. In these embodiments, the SPI controller can receive digitally signed read and write commands from a BMC or other device during runtime of a host computing device. A signed write command can include data to be written to a first portion of the NVRAM. For example, and without limitation, the signed write command might be a command to write configuration data, a portion of a firmware, or other data to the NVRAM. Both the command and the data to be written are digitally signed in one embodiment.

In response to receiving a signed write command, the SPI controller can verify the signature of the command and the signature of the data to be written utilizing a public key associated with the BMC. If the SPI controller can verify the digital signatures of the command and the data, the SPI controller performs the requested write command by writing the data to the first portion of the NVRAM. In an embodiment, the SPI controller also computes a hash of the first portion of the NVRAM and stores the hash for later use in checking the integrity of the first portion of the NVRAM. The SPI storage device then generates a signed response to the write command and transmits the signed response to the BMC in reply to the signed write command.

The SPI controller can also receive digitally signed read commands for reading data from a second portion of the NVRAM from the BMC during the runtime of the computing device. For example, and without limitation, the signed read command might be a command to read configuration data, portions of a firmware, or other data stored in the NVRAM.

In response to receiving a signed read command, the SPI controller can verify the digital signature of the signed read command using the public key associated with the BMC. If the SPI controller can verify the signed read command, the SPI controller computes a hash of the second portion of the NVRAM and compares the computed hash of the second portion of the NVRAM to a previously computed and stored hash of the second portion of the NVRAM.

If the computed hash of the second portion of the NVRAM and the previously computed and stored hash of the second portion of the NVRAM are the same, the SPI controller reads the requested data from the second portion of the NVRAM. The SPI controller then generates a signed response to the signed read command that includes the data read from the second portion of the NVRAM. The signed response to the read command is signed using a private key residing in the SPI controller in an embodiment.

The SPI controller transmits the signed response to the BMC in reply to the signed read command. In an embodiment, the signed response to the read command includes a hash of the data read from the second portion of the NVRAM.

In embodiments, the signed commands and signed responses described briefly above are encrypted. For example, and without limitation, signed read commands and signed write commands transmitted by a BMC to the SPI controller can be encrypted. Similarly, signed responses to read and write commands are also encrypted, in embodiments.

It should be appreciated that aspects of the above-described subject matter can also be implemented as a computer-controlled apparatus or device, a computer-implemented method, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Technologies are described herein for providing a secure SPI storage device. As discussed briefly above, the secure SPI storage device disclosed herein can provide various technical benefits such as, but not limited to, increased security as compared to existing SPI storage devices. Increased security can be achieved during runtime of a host computing device by authenticating digitally signed read and write commands directed to the secure SPI storage device, performing integrity checks on data stored by the secure SPI storage device, encrypting data stored by the secure SPI storage device, and through other mechanisms. Technical benefits other than those specifically mentioned herein can also be realized through an implementation of the disclosed technologies. Additional details regarding these aspects will be provided below with regard to FIGS. 1A-10.

It is to be appreciated that aspects of the subject matter presented herein can be implemented as a computer-implemented method, a computer-controlled apparatus or device, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1A:
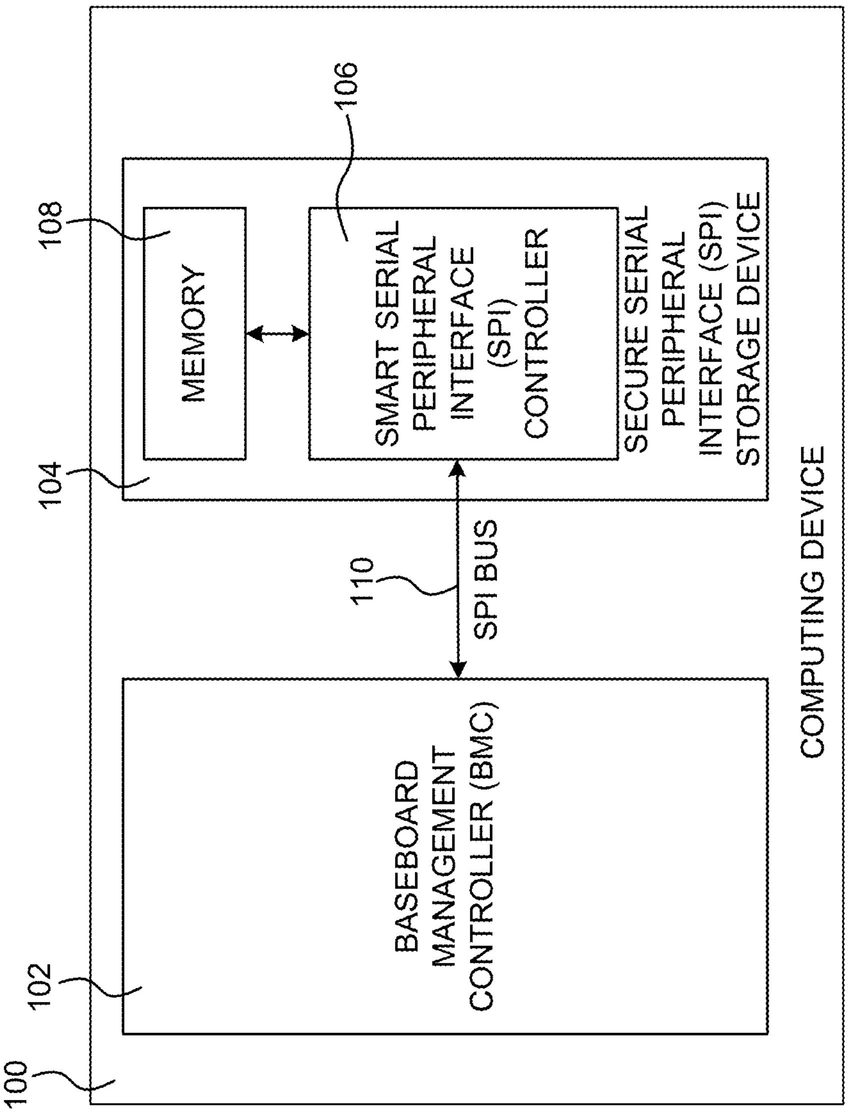
FIG. 1A is a computing architecture diagram illustrating aspects of the configuration of an SPI storage device with an integrated memory, according to one or more embodiments presented herein.

FIG. 1A is a computing architecture diagram illustrating aspects of the configuration of a computing device 100 that includes an SPI storage device 104 having an integrated memory 108, according to one or more embodiments presented herein. As shown in FIG. 1A and described in greater detail herein, the secure SPI storage device 104 is configured to provide secure storage for a computing platform, such as the computing device 100. In the illustrated embodiment, the computing device 100 includes a BMC 102. For instance, the computing device 100 might be a server computer that can be remotely managed by way of functionality provided by the BMC 102.

According to embodiments, the BMC 102 can provide functionality for remotely managing the computing device 100 including, but not limited to, monitoring various aspects of the operational state of the computing device 100 using sensors, and communicating data describing the operational state of the computing device 100 to a management system through an out-of-band ("OOB") network (not shown in FIG. 1A).

As discussed briefly above, the computing device 100 might be implemented as a server computer, for example, with one or more host central processing units ("CPUs") (not shown in FIG. 1A), which might include one or more processor cores. The CPUs might communicate with other components in the computing device 100 directly or by way of a host input/output ("I/O") processor. In some computing devices, the host I/O processor is implemented as a Platform Controller Hub ("PCH"). Other types of host I/O processors can be used with other types of CPU architectures. The computing device 100 can include many other components, some of which are described below with regard to FIGS. 9 and 10.

As mentioned briefly above, the SPI storage device 104 includes an integrated memory 108, such as a non-volatile random access memory ("NVRAM") in one embodiment disclosed herein. The SPI storage device 104 also includes a "smart" SPI controller 106, which receives commands on an SPI bus 110 for performing various types of operations. SPI is a bus standard that is commonly utilized to send data between microcontrollers and small peripherals, such as memory devices. SPI utilizes a high-speed, full-duplex protocol designed for simple and efficient data transfer.

According to various embodiments, the SPI controller 106 can receive read and write commands from the BMC 102 by way of the SPI bus 110 during runtime of the computing device 100 for reading and writing data to and from the memory 108, respectively. The SPI controller 106 can receive and process other types of commands from other types of devices in other embodiments, some of which will be described in greater detail below.

Figure 1B:
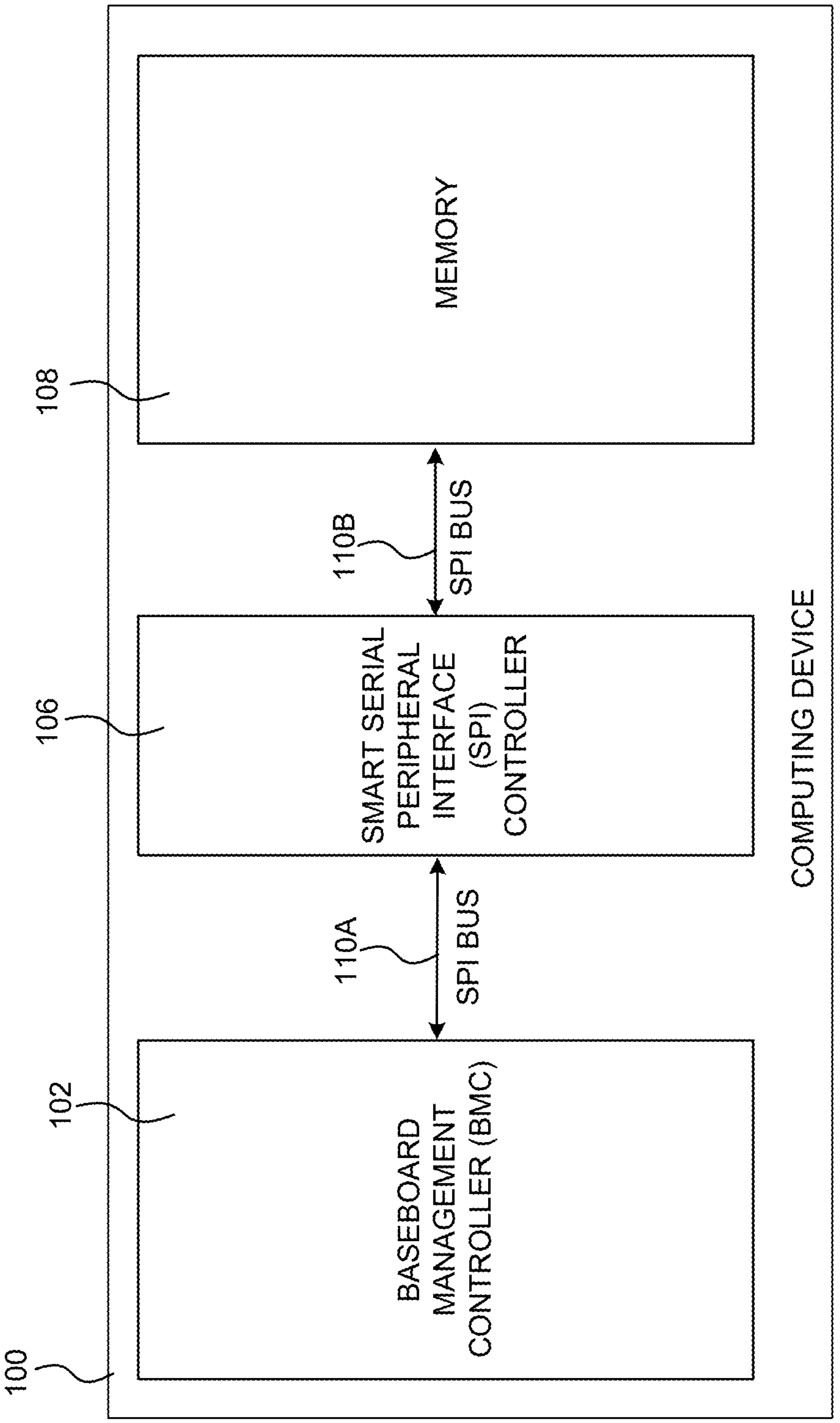
FIG. 1B is a computing architecture diagram illustrating aspects of the configuration of an SPI storage device with an external memory, according to one or more embodiments presented herein.

FIG. 1B is a computing architecture diagram illustrating aspects of another configuration for the SPI storage device 104, according to one or more embodiments presented herein. In the embodiment shown in FIG. 1B, the SPI controller 106 and the memory 108 are implemented as separate packages. The SPI controller 106 receives and responds to commands from a BMC 102 or another device by way of an SPI bus 110A. The SPI controller 106 stores data in or reads data from the memory 108 by way of a second SPI bus 110B. The configuration shown in FIG. 1B allows the functionality disclosed herein to be provided using an existing memory devices. In this regard, it is to be appreciated that the configurations shown in FIGS. 1A and 1B are merely illustrative. Other implementations will be apparent to those skilled in the art.

Figure 2:
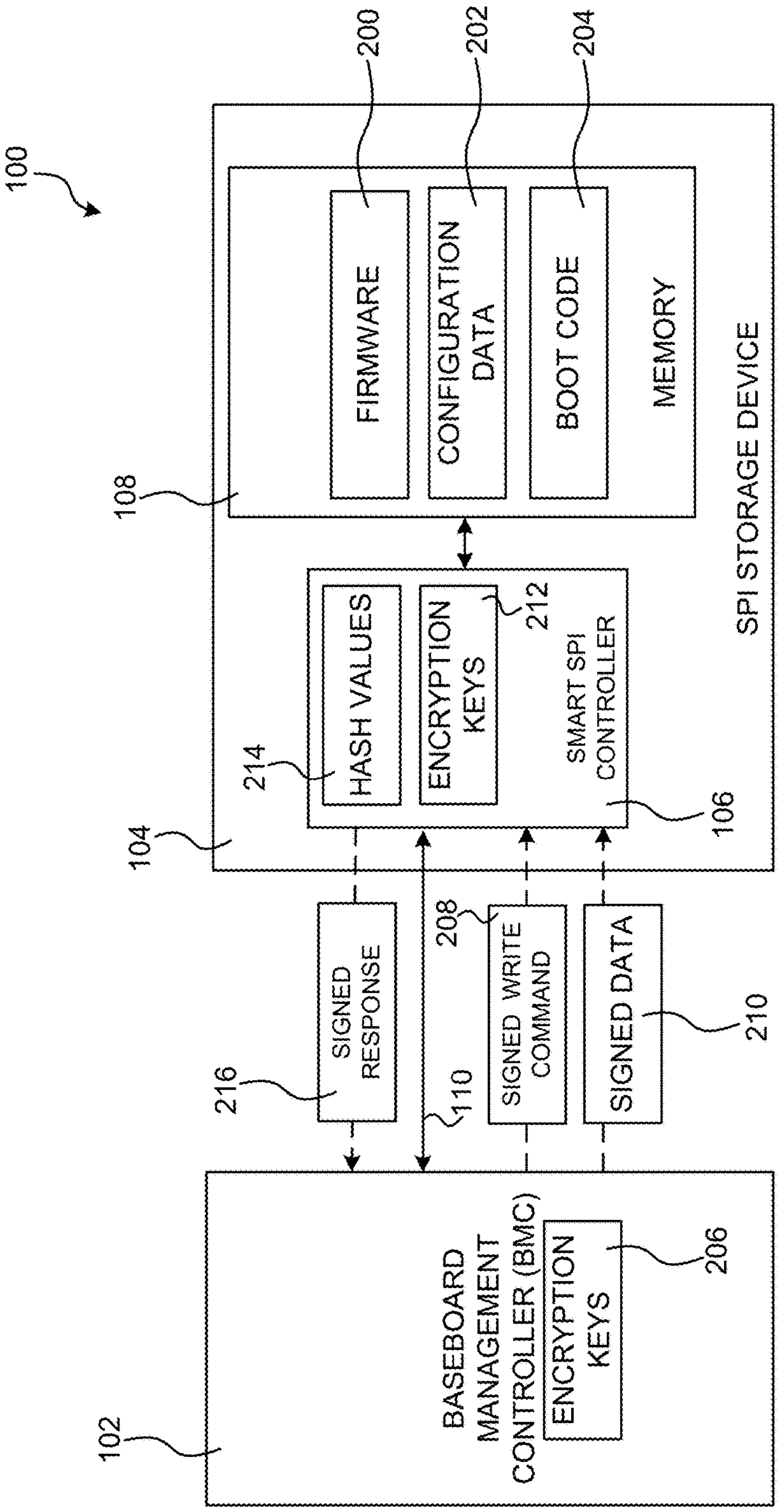
FIG. 2 is a computing architecture diagram showing aspects of the operation of an SPI storage device and a baseboard management controller when performing an authenticated write operation, according to one or more embodiments presented herein.
Figure 3A:
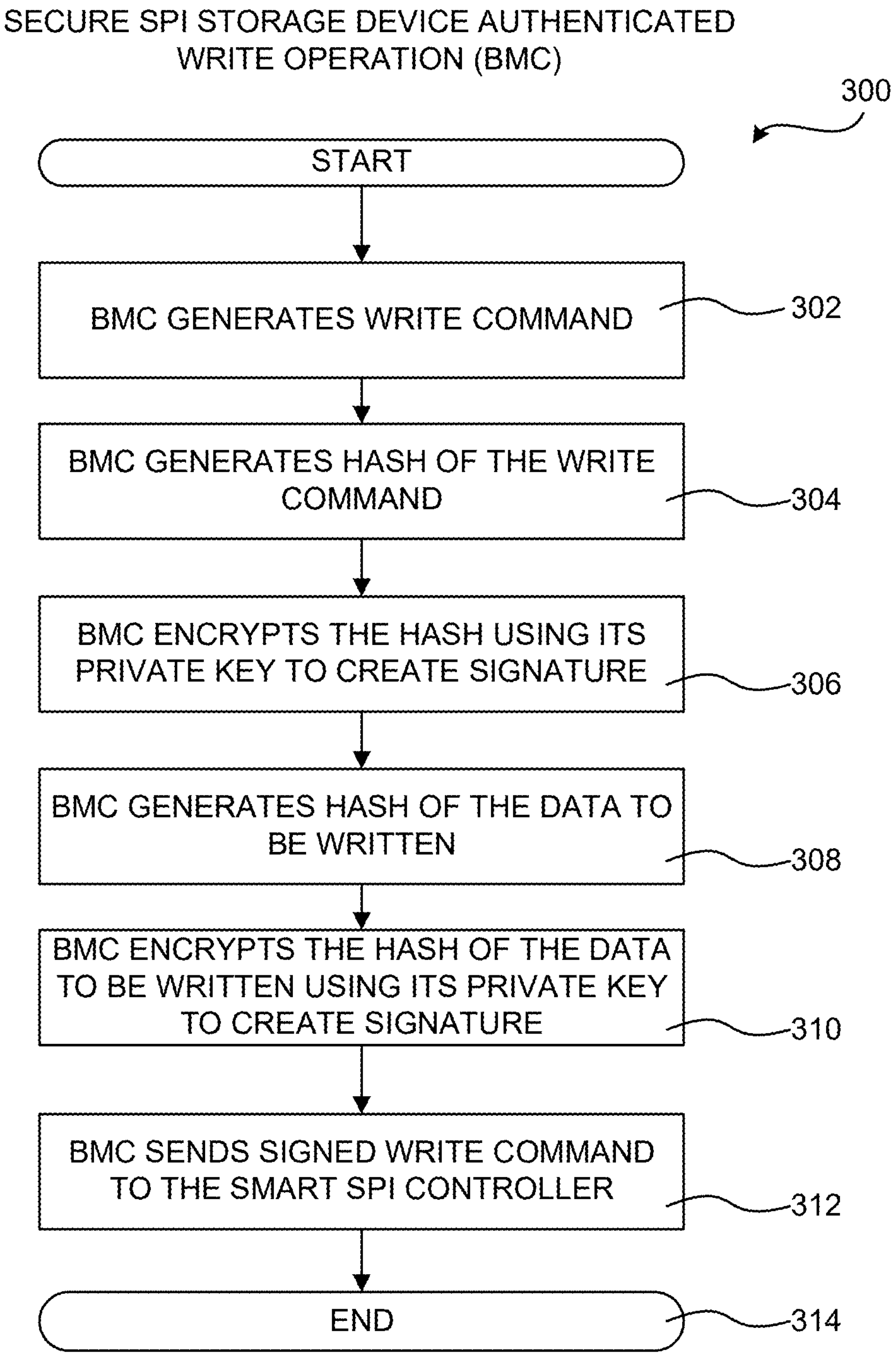
FIG. 3A is a flow diagram illustrating aspects of the operation of a baseboard management controller for performing an authenticated write operation to an SPI storage device, according to one or more embodiments presented herein.
Figure 3B:
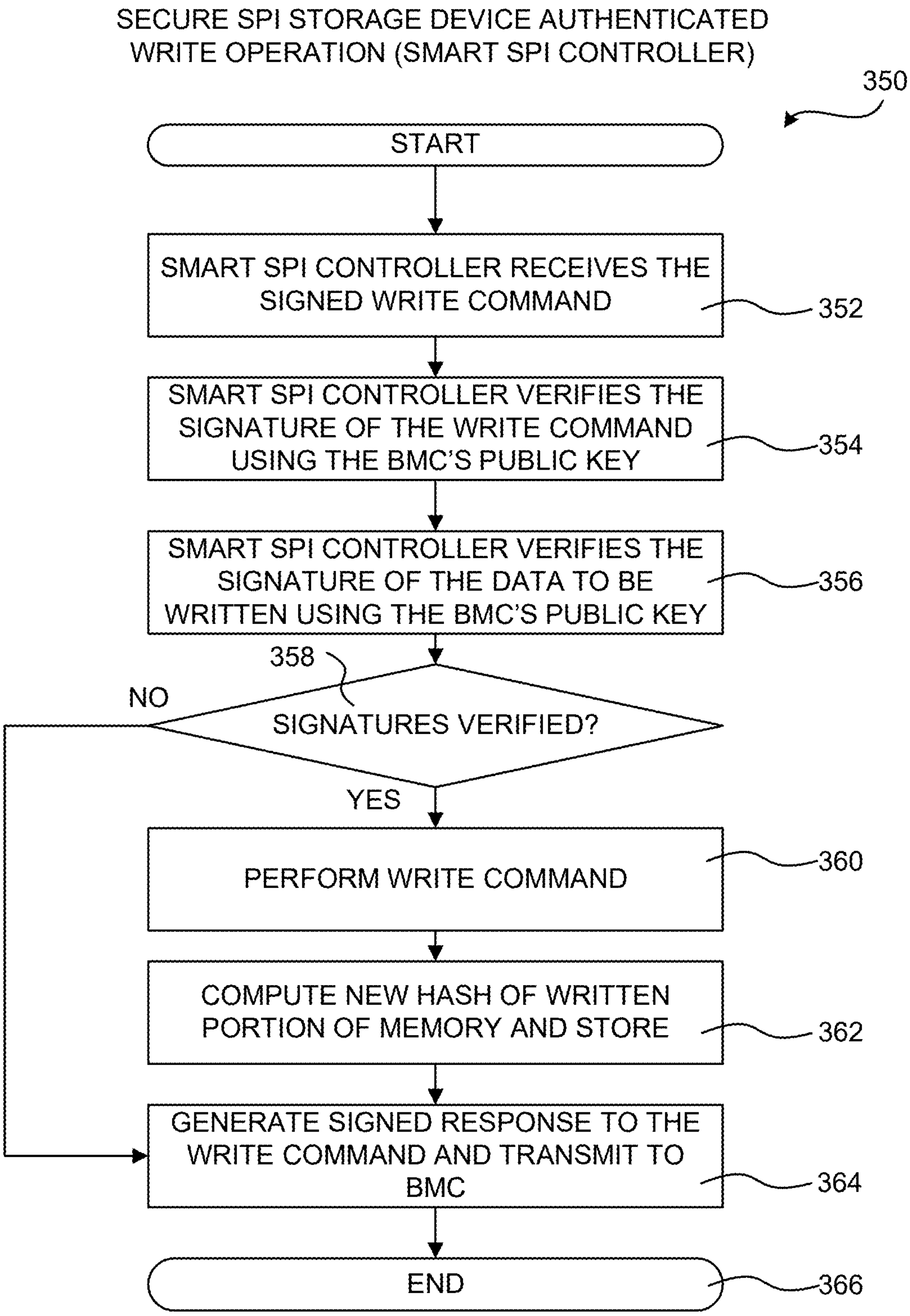
FIG. 3B is a flow diagram illustrating aspects of the operation of an SPI storage device for performing an authenticated write operation, according to one or more embodiments presented herein.
Figure 4:
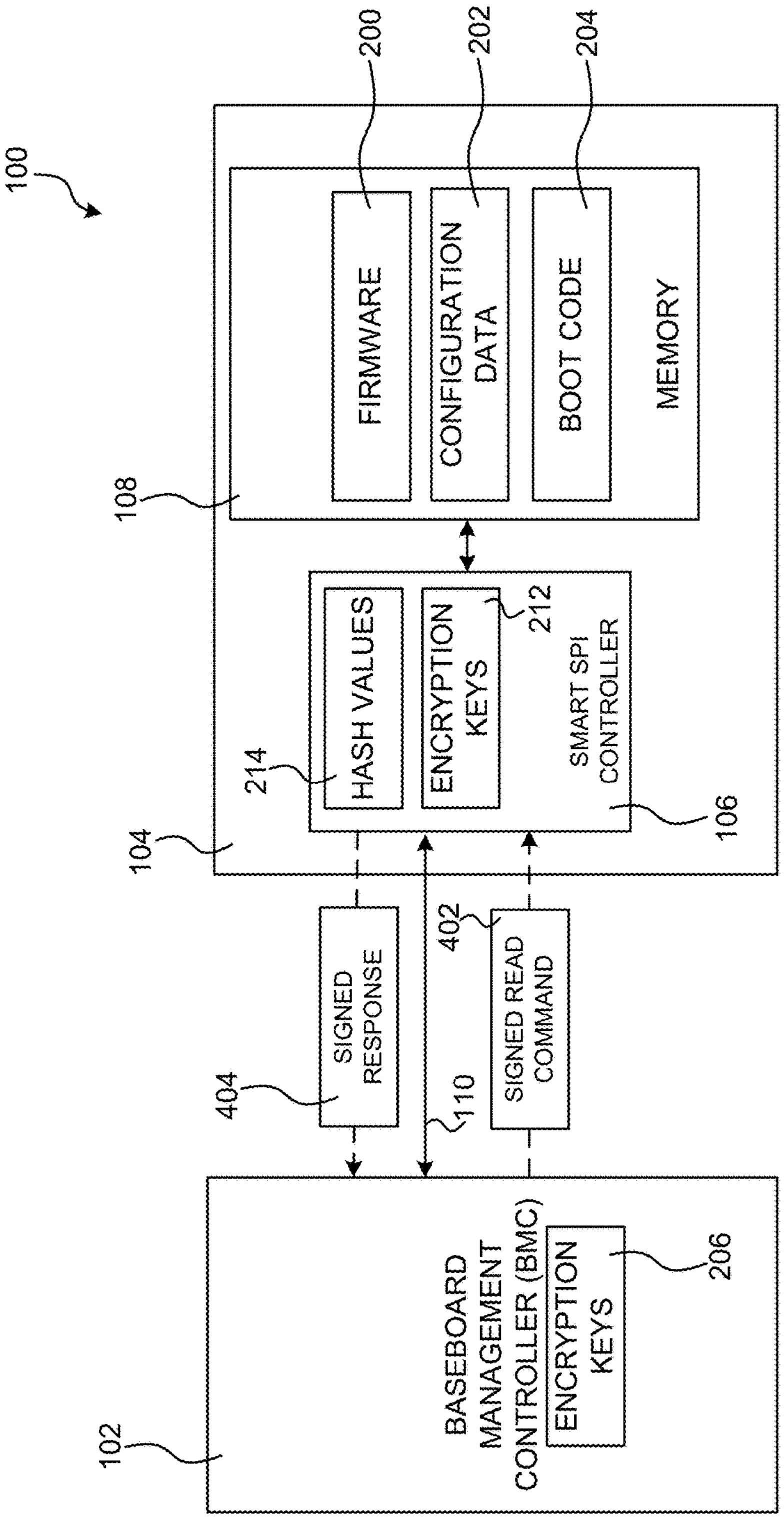
FIG. 4 is a computing architecture diagram showing aspects of the operation of an SPI storage device and a baseboard management controller for performing an authenticated read operation, according to one or more embodiments presented herein.
Figure 5A:
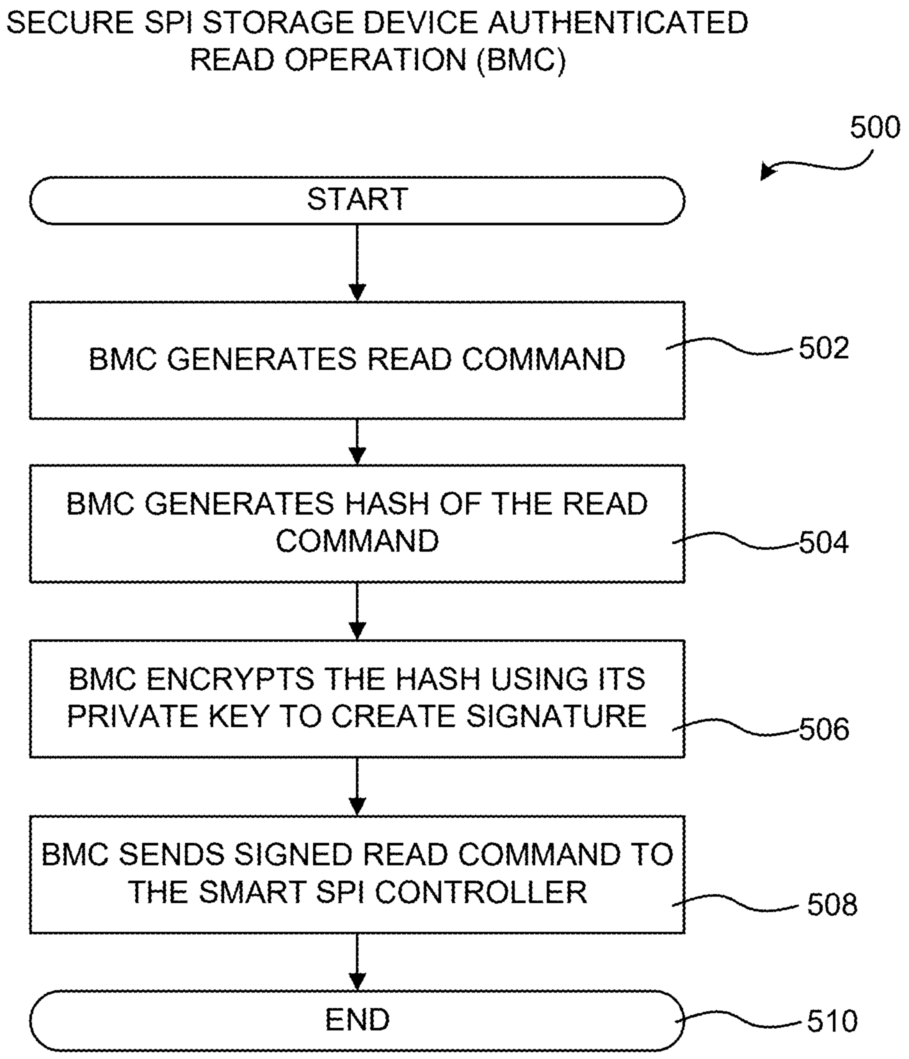
FIG. 5A is a flow diagram illustrating aspects of the operation of a baseboard management controller for performing an authenticated read operation on an SPI storage device, according to one or more embodiments presented herein.
Figure 5B:
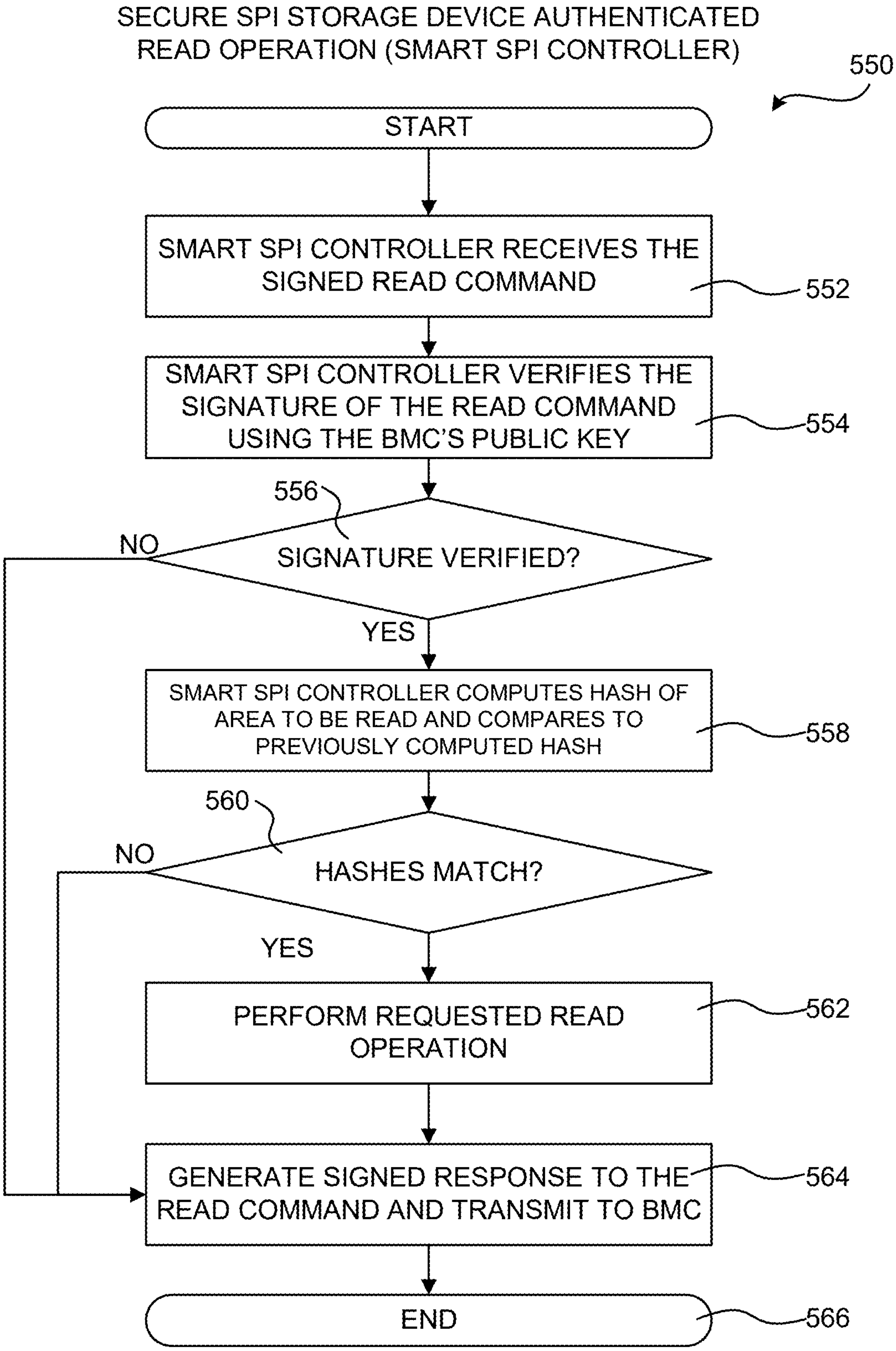
FIG. 5B is a flow diagram illustrating aspects of the operation of an SPI storage device for performing an authenticated read operation, according to one or more embodiments presented herein.

FIG. 2 is a computing architecture diagram showing aspects of the operation of the SPI storage device 104 and a BMC 102 when performing an authenticated write operation, according to one or more embodiments presented herein. As discussed briefly above, the SPI storage device 104 includes a memory 108, which might be integrated with or extern to the SPI controller 106 according to embodiments. As shown in FIG. 2, the memory 108 can be utilized to store a firmware 200 for the computing device 100, configuration data 202 for the computing device 202, boot code 204 for the computing device 100, and/or other types of data. The SPI storage device 104 provides functionality for reading and writing the data stored in the memory 108 in an authenticated fashion. FIGS. 2, 3A, and 3B illustrated aspects of an authenticated write operation while FIGS. 4, 5A, and 5B illustrate aspects of an authenticated read operation.

It is to be appreciated that while the embodiments disclosed herein are primarily presented in the context of authenticated read and write commands, other types of commands can be authenticated and performed in a similar fashion. For example, and without limitation, commands for defining a portion of the memory 108 upon which the SPI controller 106 is to perform integrity checking and commands for erasing portions of the memory 108 of the secure SPI storage device 104 can be authenticated and performed in a similar manner. Other commands not specifically identified herein can also be executed using the disclosed mechanism.

As discussed briefly above, the commands received by the SPI controller 106 include a digital signature. In these embodiments, a sender, such as the BMC 102, transmits signed commands for performing operations to the SPI controller 106 during runtime of the computing device 100. For example, and without limitation, in various embodiments, the BMC 102 can send a signed write command 208 for writing data 210 to the memory 108 of the secure SPI storage device 104. As discussed below with regard to FIGS. 4, 5A, and 5B, the BMC 102 can also send a signed read command for reading data from the memory 108 of the secure SPI storage device 104.

The signed write command 208 can include data 210 to be written to a portion of the memory 108. For example, and without limitation, the signed write command 208 might be a command to write configuration data 202, all or a portion of the firmware 200, or other data to the memory 108. Both the command 208 and the data 210 to be written are digitally signed in one embodiment.

In order to digitally sign commands and associated data, the BMC 102 stores certificates and static or dynamically negotiated encryption keys 206 in one embodiment disclosed herein. For example, and without limitation, in order to generate a digital signature for a write command, the BMC 102 might generate a cryptographic hash of the write command and encrypt the hash using its private key. The write command and the digital signature form the signed write command 208, which is transmitted to the SPI controller 106. This data to be written to the memory 108 can be digitally signed in a similar manner to form the signed data 210.

The SPI controller 106 also stores certificates and static or dynamically negotiated encryption keys 212 for use in verifying signed commands and data sent by the BMC 102 and for generating signed responses 216. For example, in response to receiving a signed write command 208, the SPI controller 106 can verify the digital signature of the signed write command 208 and the digital signature of the signed data 210 utilizing a public key associated with the BMC 102. If the SPI controller 106 can verify the digital signatures of the signed write command 208 and the signed data 210, the SPI controller 106 performs the requested write operation by writing the data to the memory 108. The SPI storage device 104 then generates a signed response 216 to the write command 208 and transmits the signed response 216 to the BMC 102 in reply to the signed write command 208.

In an embodiment, the SPI controller 106 also computes and stores hash values 214 for data stored in the memory 108. For example, and without limitation, the SPI controller 106 can compute hash values 214 for portions of the memory 108 following the performance of a write command and store the hash values 214. The hash values 214 can be computed on a per-sector, file, image, or other unit of storage basis.

When the SPI controller 106 receives a subsequent read command, it can compute a new hash value, or values, for the portion of the memory to be read. The SPI controller 106 then compares the newly computed hash value, or values, to the previously computed and stored hash value, or values 214. If the new and old hash values are identical, then the SPI controller 106 performs the requested read command. If the new and old hash values are not identical, the SPI controller 106 can return a signed response 216 to the read command that indicates that an error occurred. In this manner, the SPI controller 106 can verify the integrity of the data stored in the memory 108 each time a read operation is performed. Additional details regarding this process are provided below.

FIG. 3A is a flow diagram showing a routine 300 that illustrates aspects of the operation of a BMC 102 for performing an authenticated write operation to the SPI storage device 104, according to one or more embodiments presented herein. It is to be appreciated that the logical operations described herein with respect to FIG. 3A, and the other FIGS., can be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations might be performed than shown in the FIGS. and described herein. These operations can also be performed in parallel or in a different order than those described herein. These operations can also be performed by components other than those specifically identified.

The routine 300 begins at operation 302, where the BMC 102 generates a write command. The routine 300 then proceeds from operation 302 to operation 304, where the BMC 102 generates a hash of the write command generated at operation 302. The routine 300 then proceeds from operation 304 to operation 306, where the BMC 102 encrypts the hash generated at operation 304 using its private key to create a digital signature for the write command. In this manner, the BMC 102 creates the signed write command 208 that is transmitted to the SPI controller 106.

From operation 306, the routine 300 proceeds to operation 308, where the BMC 102 generates a hash of the data to be written by the signed write command 208. The routine 300 then proceeds from operation 308 to operation 310, where the BMC 102 encrypts the hash of the data to be written utilizing its private key to create a digital signature for the data to be written. In this manner, the BMC 102 creates the signed data 210.

Once the signed write command 208 and the signed data 210 have been created in the manner described above, the routine 300 proceeds from operation 310 to operation 312, where the BMC sends the signed write command 208 and the signed data 210 to the SPI controller 106. The routine 300 then proceeds from operation 312 to operation 314, where it ends. The processing of the signed write command 208 and the signed data 210 by the SPI controller 106 are described below with regard to FIG. 3B.

FIG. 3B is a flow diagram showing a routine 350 that illustrates aspects of the operation of the SPI storage device 104 for performing an authenticated write operation, according to one or more embodiments presented herein. The routine 350 begins at operation 352, where the SPI controller 106 receives the signed write command 208 and the signed data 210 from the BMC 102.

The routine 350 then proceeds from operation 352 to operation 354, where the SPI controller 106 attempts to verify the digital signature of the signed write command 208 using the public key of the BMC 102. From operation 354, the routine 300 proceeds to operation 356, where the SPI controller 106 attempts to verify the digital signature of the signed data 210, also using the public key of the BMC 102

From operation 356, the routine 350 proceeds to operation 358, where the SPI controller 106 determines if the signatures of the signed write command 208 and the signed data 210 were verified. If either of the signatures could not be verified, the routine 350 proceeds from operation 358 to operation 364, where a signed response 216 can be generated that indicates that the write operation could not be performed. If, however, both of the signatures can be verified, the routine 350 proceeds from operation 358 to operation 360.

At operation 360, the SPI controller 106 performs the write operation requested by the signed write command 208 on the memory 108. The routine 350 then proceeds from operation 360 to operation 362, where the SPI controller 106 computes and stores a new hash value, or values, for the written portion of the memory 108. As discussed briefly above and in greater detail below, the stored hash values 214 can be utilized to verify the integrity of stored data at the time of a subsequent read operation.

From operation 362, the routine 350 proceeds to operation 364, where the SPI controller generates a signed response 216 to the write command. The signed response 216 can indicate whether the write operation was a success or failure. In an embodiment, the signed response 216 also include the hash values 214 computed at operation 362. In this embodiment, the BMC 102 can utilize the hash values 214 to perform its own integrity checking when a subsequent read operation is performed. From operation 364, the routine 350 proceeds to operation 366, where it ends.

FIG. 4 is a computing architecture diagram showing aspects of the operation of the SPI storage device 104 and the BMC 102 for performing an authenticated read operation, according to one or more embodiments presented herein. As shown in FIG. 4, the SPI controller 106 can also receive a signed read command 402 from the BMC 102 for reading data from the memory 108 during the runtime of the computing device 100. For example, and without limitation, the signed read command 402 might be a command to read configuration data 202, all or a portion of a firmware 200, boot code 204, or other data stored in the memory 108.

In response to receiving a signed read command 402, the SPI controller 106 can verify the digital signature of the signed read command 402 using the public key associated with the BMC 102. If the SPI controller 106 can verify the signed read command 402, the SPI controller 106 reads the requested data from the memory 108. The SPI controller 106 then computes a hash value, or values, of the portion of the memory 108 to be read. The SPI controller 106 then compares the computed hash of the portion of the memory 108 to be read to a previously computed and stored hash value 214 of the portion of the memory 108 to be read.

If the newly computed hash of the portion of the memory 108 to be read and the previously computed and stored hash value 214 of the same portion are the same, the SPI controller 106 reads the requested data from the memory 108. The SPI controller 106 then generates a signed response 404 to the signed read command 402 that includes the data read from the memory 108. As discussed above, the signed response 404 to the read command 402 is signed using a private key residing in the SPI controller 106 in an embodiment. The SPI controller 106 then transmits the signed response 404 to the BMC 102 in reply to the signed read command 402.

FIG. 5A is a flow diagram showing a routine 500 that illustrates aspects of the operation of the BMC 102 for performing an authenticated read operation on the SPI storage device 104, according to one or more embodiments presented herein. The routine 500 begins at operation 502, where the BMC 102 generates a read command. The routine 500 then proceeds from operation 502 to operation 504, where the BMC 102 generates a hash of the read command generated at operation 502.

The routine 500 then proceeds from operation 504 to operation 506, where the BMC 102 encrypts the hash generated at operation 504 using its private key to create a digital signature for the read command. In this manner, the BMC 102 creates the signed read command 402 that is transmitted to the SPI controller 106.

Once the signed read command 402 has been created in the manner described above, the routine 500 proceeds from operation 506 to operation 508, where the BMC sends the signed read command 402 to the SPI controller 106. The routine 500 then proceeds from operation 508 to operation 510, where it ends. The processing of the signed read command 402 by the SPI controller 106 is described below with regard to FIG. 5B.

FIG. 5B is a flow diagram showing a routine 550 that illustrates aspects of the operation of the SPI storage device 104 for performing an authenticated read operation, according to one or more embodiments presented herein. The routine 550 begins at operation 552, where the SPI controller 106 receives the signed read command 402 from the BMC 102. The routine 550 then proceeds from operation 552 to operation 554, where the SPI controller 106 verifies the digital signature of the signed read command 402 using the public key associated with the BMC 102.

From operation 554, the routine 550 proceeds to operation 556, where the SPI controller 106 determines if the digital signature of the signed read command 402 was verified. If the digital signature of the signed read command 402 could not be verified, the routine 500 proceeds from operation 556 to operation 564, where the SPI controller 106 can generate a signed response 404 to the read command indicating that the read operation failed. If, however, the SPI controller 106 successfully verifies the digital signature of the signed read command 402, then the routine 550 proceeds from operation 556 to operation 558.

At operation 558, the SPI controller 106 computes a new hash value, or values, for the portion of the memory 108 that is to be read from. The SPI controller 106 also compares the newly computed hash value, or values, to the previously stored hash values 214 for the portion of the memory 108. If the newly computed and previously stored hash values are not the same, the routine 550 proceeds from operation 560 to operation 564, where the SPI controller 106 can generate a signed response 404 to the read command indicating that the read operation failed. If, however, the newly computed and previously stored hash values are identical, the routine 550 proceeds from operation 560 to operation 562, where the SPI controller 106 performs the requested read operation.

The routine 550 then proceeds from operation 562 to operation 564, where the SPI controller 106 generates a signed response 404 to the signed read command 402 and transmits the signed response 404 to the BMC 102. The signed response 404 can include the data read from the memory 108 along with a digital signature for the read data. The routine 550 proceeds from operation 564 to operation 566, where it ends.

In embodiments, the signed commands and signed responses described above are encrypted. For example, and without limitation, signed read commands 402 and signed write commands 208 transmitted by the BMC 102 to the SPI controller 106 can be encrypted. Similarly, signed responses 216 to read and write commands are also encrypted in embodiments for increased security. The encryption keys 206 stored by the BMC 102 and the encryption keys 212 stored by the SPI controller 106 can be utilized to encrypt the commands and responses, respectively.

Figure 6:
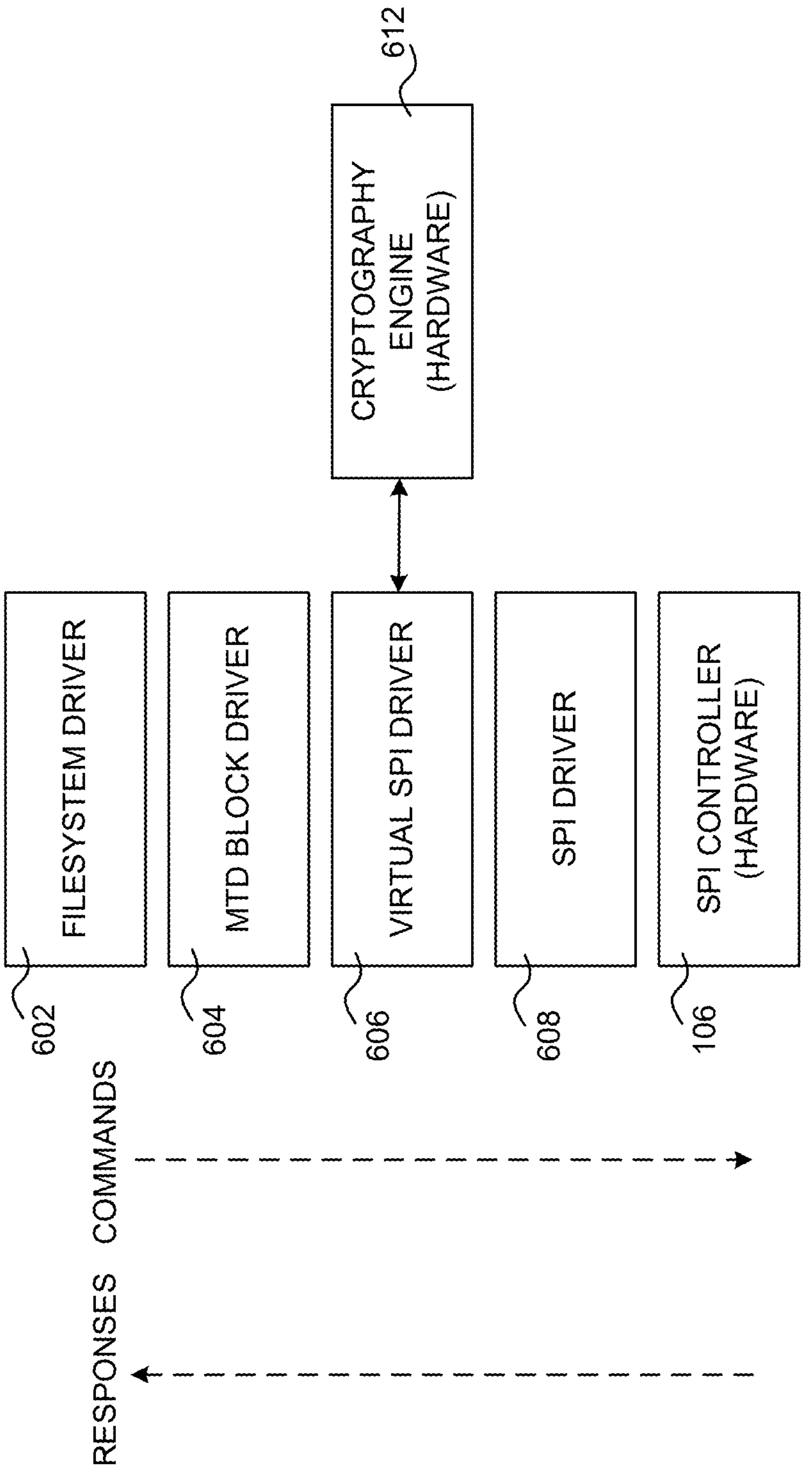
FIG. 6 is a software architecture diagram showing an illustrative software stack for implementing aspects of the functionality disclosed herein within a baseboard management controller, according to one or more embodiments presented herein.

FIG. 6 is a software architecture diagram showing an illustrative software stack for implementing aspects of the functionality disclosed herein within a firmware executing on the BMC 102, according to one or more embodiments. In the embodiment shown in FIG. 6, the functionality described above as being performed by the BMC 102 is performed by a combination of hardware and software. In particular, aspects of the functionality disclosed herein are performed by a virtual SPI driver 606 or, alternately, could be performed in an SPI driver 608.

In the embodiment illustrated in FIG. 6, a virtual SPI driver 606 receives unsigned commands from a memory technology device ("MTD") block driver 604. The virtual SPI driver 606 then signs the unsigned commands to create signed commands. In an embodiment, the virtual SPI driver 606 uses a hardware cryptography engine 612 to sign the commands. The signed commands are then passed to an SPI driver 608 and, subsequently, to the SPI controller 106 for processing in the manner described above.

Responses are passed from the SPI controller 106 to the SPI driver 608 which, in turn, passes them to the virtual SPI driver 606. The virtual SPI driver 606 performs the integrity checking described above before passing the responses to the MTD block driver 604. The MTD block driver 604, in turn, passes the responses to a filesystem driver 602.

Figure 7:
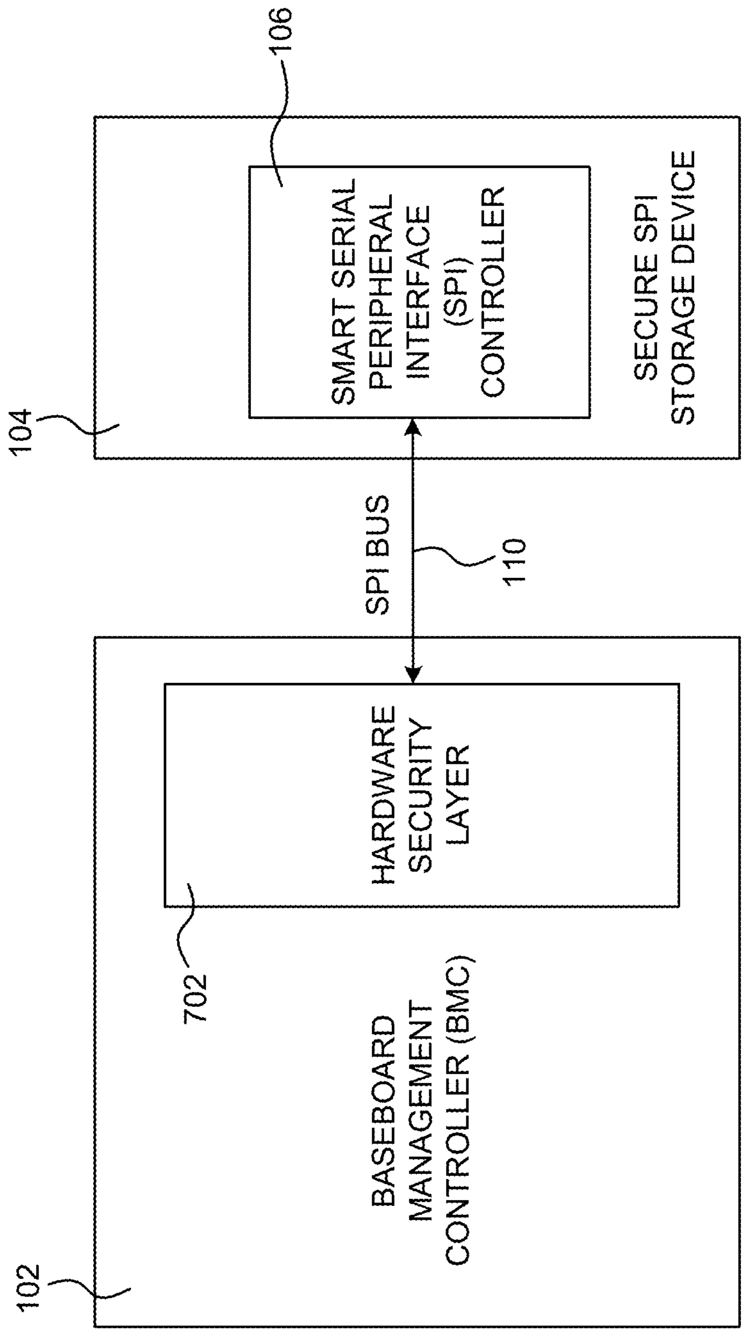
FIG. 7 is a computing architecture diagram showing an illustrative hardware implementation for a baseboard management controller that implements aspects of the functionality disclosed herein, according to one or more embodiments presented herein.

FIG. 7 is a computing architecture diagram showing an illustrative architecture for the BMC 102 that implements aspects of the functionality disclosed herein in hardware, according to one or more embodiments presented herein. In the embodiment shown in FIG. 7, the BMC 102 includes a hardware security layer 702 that communicates with the SPI controller 106 over the SPI bus 110 and performs the functionality described above.

The hardware security layer 702 performs the functions described above as being performed by the BMC 102, such as, but not limited to, issuing signed commands to the SPI controller 106 and receiving signed responses from the SPI controller 106. In embodiments, the hardware security layer 702 can also utilize the hash values described above to validate data stored by the SPI storage device 104 in the manner described above.

Figure 8:
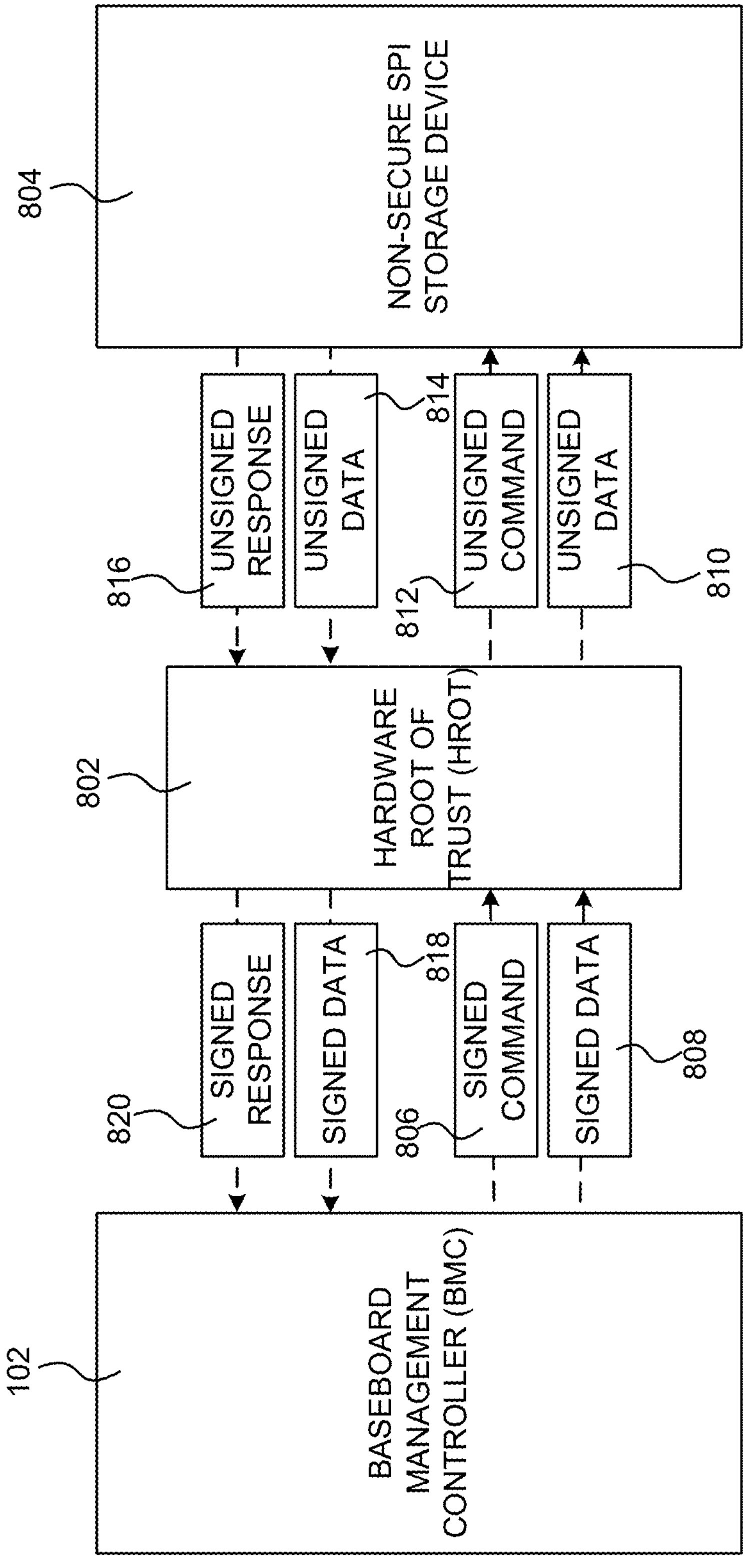
FIG. 8 is a computing architecture diagram showing an illustrative hardware implementation wherein a hardware root of trust implements aspects of the functionality disclosed herein, according to one or more embodiments presented herein.

FIG. 8 is a computing architecture diagram showing an illustrative hardware implementation wherein a hardware root of trust ("HRoT") 802 implements aspects of the functionality disclosed herein, according to one or more embodiments presented herein. As discussed briefly above with regard to FIG. 1A, the secure SPI storage device 104 comprises an integrated package that includes the SPI controller 106 and the memory 108 in one embodiment. In another embodiment, which is illustrated in FIG. 1B and described briefly above, the SPI controller 106 and the memory 108 are separate packages. FIG. 8 illustrates a particular implementation of this embodiment wherein aspects of the functionality of the SPI controller 106 described above are performed by a HRoT 802.

As known to those skilled in the art, a HRoT is a hardware device that serves as the foundation for all secure operations of a computing system, such as the computing device 100. The HRoT 802 generates, protects and stores the cryptographic keys (e.g. encryption keys 212) that are needed for cryptographic functions within its secure environment, and it is generally part of the secure boot process that provides the foundation for a software chain of trust. Common examples of HRoTs include trusted platform modules ("TPMs") and platform-based silicon.

In the example configuration shown in FIG. 8, the HRoT 802 receives signed commands 806 from a caller, such as the BMC 102. The signed commands 806 can include signed write commands, signed read commands, and the other commands described above. The signed commands 806 can also include signed data 808. For instance, in the case of a signed write command, the data to be written can be signed and provided to the HRoT 802 with the corresponding signed command 806.

In response to receiving signed commands 806, the HRoT 802 can perform corresponding operations on a non-secure SPI storage device 804 using unsigned commands 812. For example, the HRoT 802 might issue an unsigned write command 812 to the non-secure SPI storage device 804 to write unsigned data 810 to its memory. In response thereto, the non-secure SPI storage device 804 can return an unsigned response 816, which might include unsigned data 814. For instance, in the case of a read command, the unsigned response 816 might include unsigned data 814 read from the non-secure SPI storage device 804.

In response to receiving an unsigned response 816, the HRoT 802, in turn, can generate a signed response 820 to the BMC 102 or another caller. The signed response 820 can include signed data 818, such as in the case of a read operation.

In order to monitor the integrity of the data stored in the non-secure SPI storage device 804, the HRoT 802 can also compute and maintain hash values 214 for portions of the non-secure storage device 804 and utilize the hash values 214 in the manner described above. In this manner, the HRoT 802 can determine if the contents of the non-secure SPI storage device 802 are modified by an attacker. For example, if data stored by the non-secure SPI storage device 804 is modified other than by the HRoT 802, the stored and newly computed hash values will not match.

In order to further increase the security of the data stored in the non-secure SPI storage device 804, the HRoT 802 can encrypt the data written thereto in some embodiments. The HRoT 802 can also decrypt the data when a read command is performed.

Figure 9:
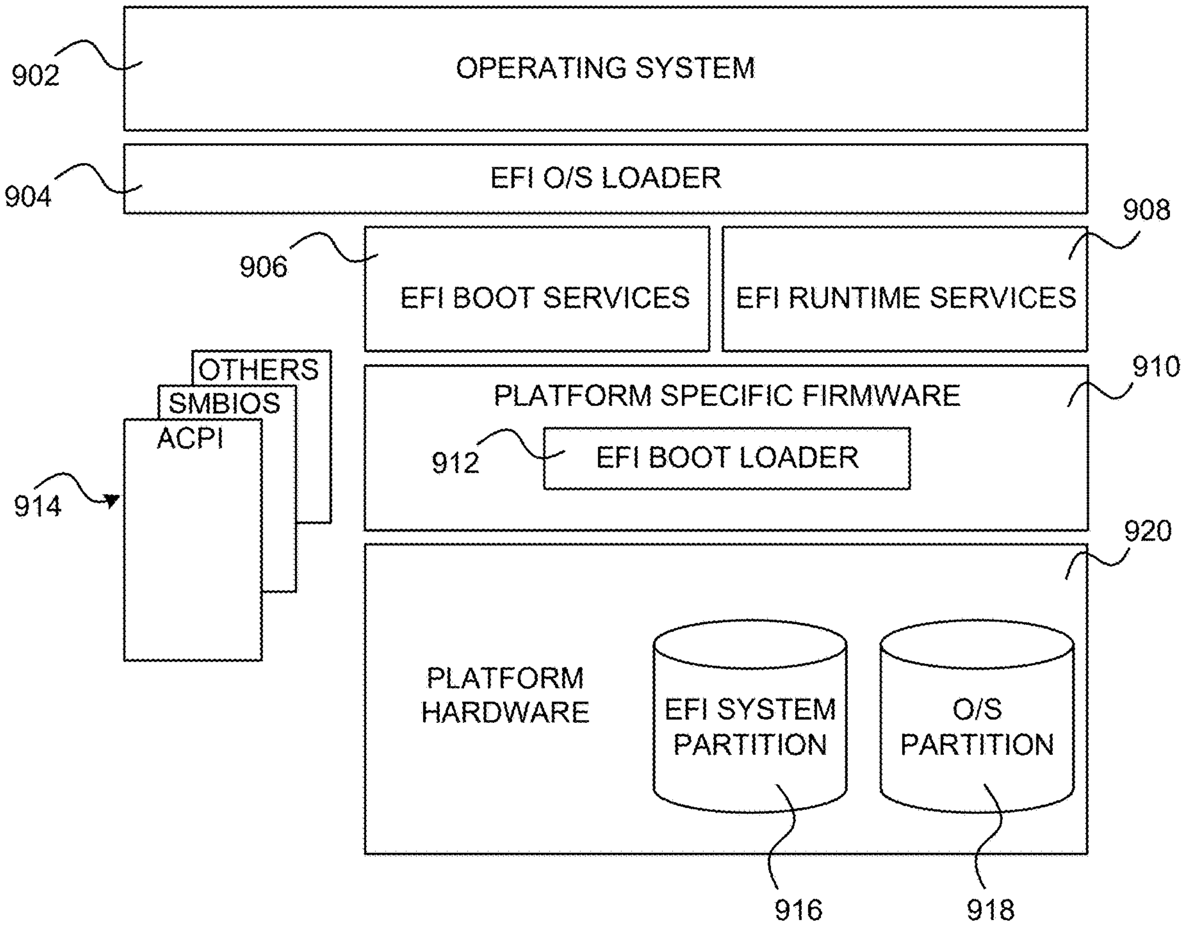
FIG. 9 is a software architecture diagram illustrating a software architecture for a unified extensible firmware interface ("UEFI")-compliant firmware that provides an operating environment for aspects of the technologies presented herein in one embodiment.

Turning now to FIG. 9, a software architecture diagram will be described that illustrates aspects of an architecture for a Unified Extensible Firmware Interface ("UEFI") Specification-compliant firmware that can be configured to provide and/or utilize aspects of the technologies disclosed herein. In particular, the firmware architecture shown in FIG. 9 can be utilized to implement the firmware 200 utilized by the computing device 100. As discussed above, the computing device 100 can act as a host for the BMC 102 and the SPI storage device 104.

The UEFI Specification describes an interface between an operating system ("OS") 902 and a UEFI Specification-compliant firmware. The UEFI Specification also defines an interface that a firmware can implement, and an interface that the OS 902 can use while booting. How a firmware implements the interface can be left up to the manufacturer of the firmware.

The UEFI Specification also defines a way for an OS 902 and a firmware to exchange information necessary to support the OS boot process. The term "UEFI Specification" used herein refers to both the EFI Specification developed by INTEL CORPORATION and the UEFI Specification managed by the UEFI FORUM.

As shown in FIG. 9, the architecture can include platform hardware 920, such as that described below with regard to FIG. 10, and the OS 902. A boot loader 912 for the OS 902 can be retrieved from the UEFI system partition 916 using a UEFI OS loader 904. The UEFI system partition 916 can be an architecturally shareable system partition. As such, the UEFI system partition 916 can define a partition and file system designed to support safe sharing of mass storage between multiple vendors. An OS partition 918 can also be utilized.

Once started, the UEFI OS loader 904 can continue to boot the complete OS 902. In doing so, the UEFI OS loader 904 can use UEFI boot services 906, an interface to other supported specifications to survey, comprehend, and initialize the various platform components and the OS software that manages them. Thus, interfaces 914 from other specifications can also be present on the system. For example, the Advanced Configuration and Power Interface ("ACPI") and the System Management BIOS ("SMBIOS") specifications can be supported.

UEFI boot services 906 can provide interfaces for devices and system functionality used during boot time. UEFI runtime services 908 can also be available to the UEFI OS loader 904 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the OS 902 and system firmware, the Framework is a group of specifications that together describe a firmware implementation that has been designed to perform the full range of operations that are required to initialize a platform from power on through transfer of control to the OS 902. The specifications that make up the Framework, which are also available from INTEL CORPORATION, are also expressly incorporated herein by reference.

Figure 10:
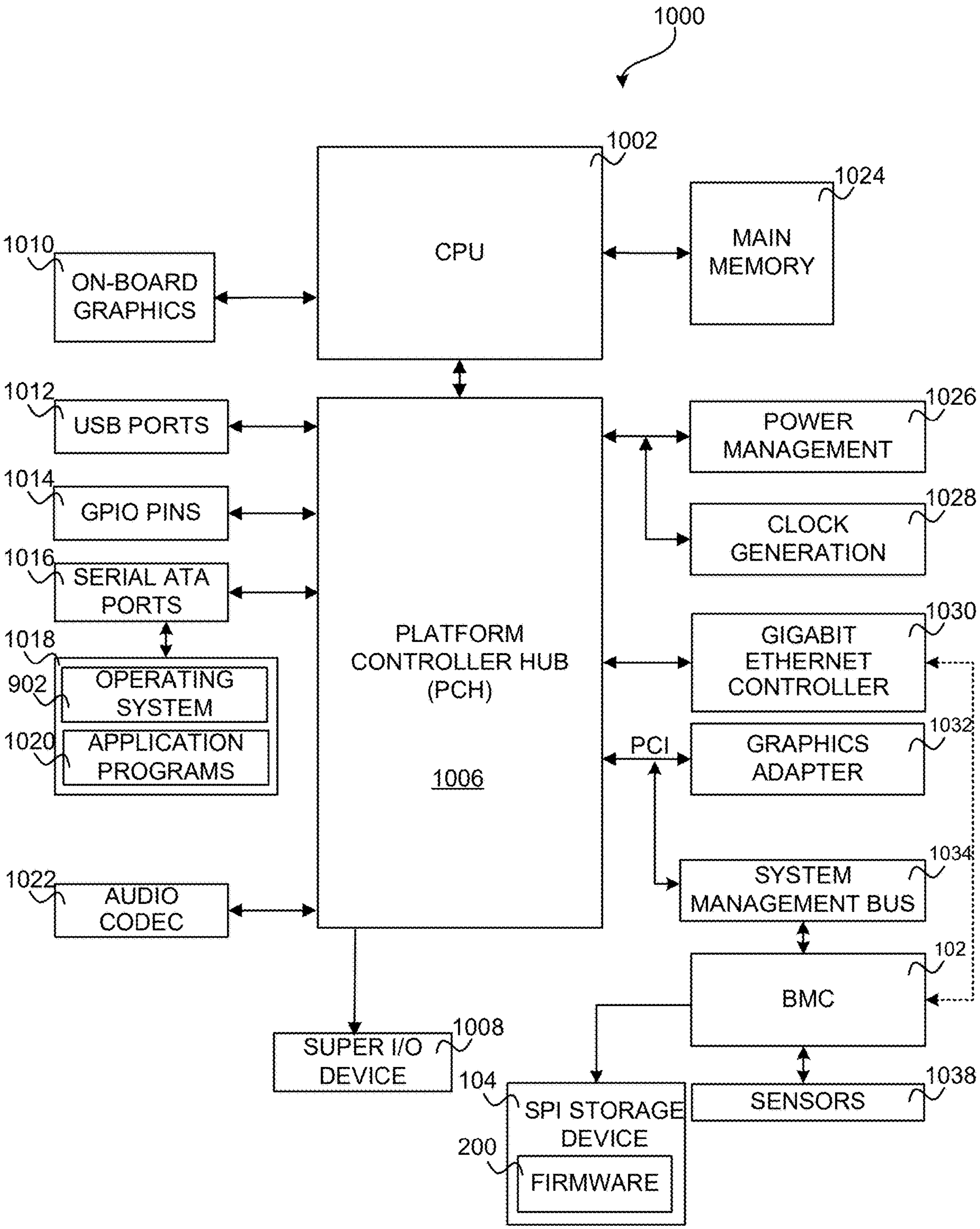
FIG. 10 is a computer architecture diagram that shows an illustrative architecture for a computer that can implement the technologies disclosed herein.

Referring now to FIG. 10, a computer architecture diagram that shows an illustrative architecture for a computer that can provide an operating environment for the technologies presented herein will be described. For example, and without limitation, the computer architecture shown in FIG. 10 can be utilized to implement the computing device 100 and/or any of the other computing systems disclosed herein.

FIG. 10 and the following discussion are intended to provide a brief, general description of a suitable computing environment in which the configurations described herein can be implemented. While the technical details are presented herein in the general context of program modules that execute in conjunction with the execution of an OS, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

The computer architecture shown in FIG. 10 can be utilized to implement a computer 1000 capable of being utilized as a host for the SPI storage device 104 in the implementations described herein. The illustrative computer architecture shown in FIG. 10 includes a baseboard, or "motherboard", which is a printed circuit board to which a multitude of components or devices can be connected by way of a system bus or other electrical communication path.

In one illustrative configuration, a central processing unit ("CPU") 1002 operates in conjunction with a Platform Controller Hub ("PCH") 1006. The CPU 1002 is a central processor that performs arithmetic and logical operations necessary for the operation of the computer 1000. The computer 1000 can include a multitude of CPUs 1002. Each CPU 1002 might include multiple processing cores.

The CPU 1002 provides an interface to a random access memory ("RAM") used as the main memory 1024 in the computer 1000 and, possibly, to an on-board graphics adapter 1010. The PCH 1006 provides an interface between the CPU 1002 and the remainder of the computer 1000.

The PCH 1006 can also be responsible for controlling many of the input/output functions of the computer 1000. In particular, the PCH 1006 can provide one or more universal serial bus ("USB") ports 1012, an audio codec 1022, a Gigabit Ethernet Controller 1030, and one or more general purpose input/output ("GPIO") pins 1014. The USB ports 1012 can include USB 2.0 ports, USB 3.0 ports and USB 3.1 ports among other USB ports. The audio codec 1022 can include Intel High Definition Audio, Audio Codec '97 ("AC'97") and Dolby TrueHD among others.

The PCH 1006 can also include functionality for providing networking functionality through a gigabit Ethernet controller 1030. The gigabit Ethernet controller 1030 is capable of connecting the computer 1000 to another computer via a network. Connections which can be made by the gigabit Ethernet controller 1030 can include LAN or WAN connections. LAN and WAN networking environments are commonplace in offices, enterprise-wide computer networks, intranets, and the Internet.

The PCH 1006 can also provide a bus for interfacing peripheral card devices such as a graphics adapter 1032. In one configuration, the bus comprises a PCI bus. The PCI bus can include a Peripheral Component Interconnect ("PCI") bus, a Peripheral Component Interconnect extended ("PCI-X") bus and a Peripheral Component Interconnect Express ("PCIe") bus among others.

The PCH 1006 can also provide a system management bus 1034 for use in managing the various components of the computer 1000. Additional details regarding the operation of the system management bus 1034 and its connected components are provided below. Power management circuitry 1026 and clock generation circuitry 1028 can also be utilized during the operation of the PCH 1006.

The PCH 1006 is also configured to provide one or more interfaces for connecting mass storage devices to the computer 1000. For instance, according to one configuration, the PCH 1006 includes a serial advanced technology attachment ("SATA") adapter for providing one or more serial ATA ports 1016. The serial ATA ports 1016 can be connected to one or more mass storage devices such as SATA disk drive 1018 capable of storing an OS 902 and application programs 1020. As known to those skilled in the art, an OS 902 comprises a set of programs that control operations of a computer and allocation of resources. An application program is software that runs on top of the OS 902, or other runtime environment, and uses computer resources to perform application specific tasks desired by the user.

According to one configuration, the OS 902 comprises the LINUX OS. According to another configuration, the OS 902 comprises the WINDOWS OS from MICROSOFT CORPORATION. According to another configuration, the OS 902 comprises the UNIX OS or one of its variants. It should be appreciated that other OSs can also be utilized.

The mass storage devices connected to the PCH 1006, and their associated computer-readable storage media, provide non-volatile storage for the computer 1000. Although the description of computer-readable storage media contained herein refers to a mass storage device, such as a hard disk or CD-ROM drive, it should be appreciated by those skilled in the art that computer-readable storage media can be any available media that can be accessed by the computer 1000.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 1000.

A low pin count ("LPC") interface can also be provided by the PCH 1006 for connecting a Super I/O device 1008. The Super I/O device 1008 is responsible for providing a number of input/output ports, including a keyboard port, a mouse port, a serial interface, a parallel port, and other types of input/output ports.

It should be appreciated that the program modules disclosed herein can include software instructions that, when loaded into the CPU 1002 and executed, transform the computer 1000 into a special-purpose computer customized to facilitate all, or part of, the operations disclosed herein. As detailed throughout this description, the program modules can provide various tools or techniques by which the computer 1000 can participate within the overall systems or operating environments using the components, logic flows, and/or data structures discussed herein.

The CPU 1002 can be constructed from any number of transistors or other circuit elements, which can individually or collectively assume any number of states. More specifically, the CPU 1002 can operate as a state machine or finite-state machine. Such a machine can be transformed to a second machine, or a specific machine, by loading executable instructions contained within the program modules. These computer-executable instructions can transform the CPU 1002 by specifying how the CPU 1002 transitions between states, thereby transforming the transistors or other circuit elements constituting the CPU 1002 from a first machine to a second machine, wherein the second machine can be specifically configured to perform the operations disclosed herein. The states of either machine can also be transformed by receiving input from one or more user input devices, network interfaces (such as the gigabit Ethernet controller 1030), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to the technology used to implement the storage media, whether the storage media are characterized as primary or secondary storage, and the like. For example, if the storage media are implemented as semiconductor-based memory, the program modules can transform the physical state of the semiconductor main memory and/or NVRAM. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 1006 can include a system management bus 1034. As discussed above, when utilized to implement the computing device 100, the system management bus 1034 can host a BMC 102. The BMC 102 can be implementing using a system on chip ("SOC") architecture. As discussed above, the BMC 102 is a microcontroller that includes functionality for monitoring aspects of the operation of the computer 1000. For example, the BMC 102 can monitor health-related aspects associated with the computer 1000, such as, but not limited to, the temperature of one or more components of the computer 1000, speed of rotational components (e.g., spindle motor, CPU fan, etc.) within the computer 1000, the voltage across or applied to one or more components within the computer 1000, and the available and/or used capacity of memory devices within the computer 1000. To accomplish these monitoring functions, the BMC 102 is communicatively connected to one or more components by way of the system management bus 1034 in some configurations.

In one configuration, these components include sensor devices 1038 for measuring various operating and performance-related parameters within the computer 1000. The sensor devices 1038 can be either hardware or software based components configured or programmed to measure or detect one or more of the various operating and performance-related parameters.

The BMC 102 functions as the master on the system management bus 1034 in most circumstances but can also function as either a master or a slave in other circumstances. Each of the various components communicatively connected to the BMC 102 by way of the system management bus 1034 is addressed using a slave address. The system management bus 1034 is used by the BMC 102 to request and/or receive various operating and performance-related parameters from one or more components that are also communicatively connected to the system management bus 1034.

It should be appreciated that the functionality provided by the computer 1000 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 1000 might not include all the components shown in FIG. 10, can include other components that are not explicitly shown in FIG. 10, or might utilize an architecture completely different than that shown in FIG. 10.

As shown in FIG. 10, the computer 1000 also includes the SPI storage device 104 in one embodiment. As discussed above, the SPI storage device 104 can store the firmware 200 and other programs and data. As also discussed above, the SPI storage device 104 can also provide functionality for receiving, processing, and responding to authenticated read and write commands received from the BMC 102 in the manner disclosed herein.

Although the subject matter presented herein has been described in language specific to computer structural features, methodological acts, and computer-readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A serial peripheral interface (SPI) storage device, comprising:
- a memory; and
- a SPI controller, the SPI controller configured to
  - receive, on a SPI bus, a signed command for performing an operation,
  - authenticate the signed command,
  - perform the operation responsive to authenticating the signed command,
  - compute hash values for data stored in the memory, and
  - verify integrity of the data based on the hash values responsive to receiving the signed command.

2. The SPI storage device of claim 1, wherein the SPI controller is further configured to return a signed response to the signed command.

3. The SPI storage device of claim 1, wherein the signed command comprises a signed read command for reading data from the memory.

4. The SPI storage device of claim 1, wherein the signed command comprises a signed write command for writing data to the memory.

5. The SPI storage device of claim 1, wherein the signed command comprises a command for defining a portion of the memory for which the SPI controller is to perform integrity checking.

6. The SPI storage device of claim 1, wherein the signed command comprises a command for erasing at least a portion of the memory.

7. A serial peripheral interface (SPI) storage device, comprising:
- a non-volatile random access memory (NVRAM); and
- a SPI controller, the SPI controller configured to
  - receive a signed write command from a baseboard management controller (BMC) during a runtime of a computing device, the signed write command comprising data to be written to a first portion of the NVRAM,
  - verify a signature of the signed write command using a public key associated with the BMC,
  - verify a signature of the data using the public key associated with the BMC, and
  - responsive to verifying the signature of the signed write command and the signature of the data,
    - write the data to the first portion of the NVRAM,
    - compute a hash of the first portion of the NVRAM,
    - store the hash of the first portion of the NVRAM,
    - generate a signed response to the write command, and
    - transmit the signed response to the write command to the BMC in reply to the signed write command.

8. The SPI storage device of claim 7, wherein the SPI controller is further configured to:
- receive a signed read command from the BMC during the runtime of the computing device, the signed read command for reading data from a second portion of the NVRAM;
- verify the signed read command using the public key associated with the BMC;
- responsive to verifying the signed read command,
  - compute a hash of the second portion of the NVRAM,
  - compare the computed hash of the second portion of the NVRAM to a stored hash of the second portion of the NVRAM, and
  - responsive to determining that the computed hash of the second portion of the NVRAM and the stored hash of the second portion of the NVRAM are the same,
    - read the data from the second portion of the NVRAM,
    - generate a signed response to the read command comprising the data read from the second portion of the NVRAM, and
    - transmit the signed response to the read command to the BMC in reply to the signed read command.

9. The SPI storage device of claim 8, wherein the signed response to the read command comprises a hash of the data read from the second portion of the NVRAM.

10. The SPI storage device of claim 9, wherein the signed response to the read command is signed using a private key residing in the SPI controller.

11. The SPI storage device of claim 10, wherein the signed read command comprises a command to read configuration data stored in the NVRAM.

12. The SPI storage device of claim 10, wherein the signed write command comprises a command to write configuration data stored in the NVRAM.

13. The SPI storage device of claim 10, wherein the signed write command comprises a command to write a firmware stored in the NVRAM.

14. A computer-implemented method, comprising:
- receiving a signed write command from a baseboard management controller (BMC) during a runtime of a computing device, the signed write command comprising data to be written to a first portion of a non-volatile random access memory (NVRAM);
- responsive to receiving the signed write command, verifying a signature of the signed write command using a public key associated with the BMC;
- responsive to receiving the signed write command, verifying a signature of the data using the public key associated with the BMC; and
- responsive to verifying the signature of the signed write command and the signature of the data,
  - writing the data to the first portion of the NVRAM,
  - computing a hash of the first portion of the NVRAM,
  - storing the hash of the first portion of the NVRAM,
  - generating a signed response to the write command, and
  - transmitting the signed response to the write command to the BMC in reply to the signed write command.

15. The computer-implemented method of claim 14, further comprising:

receiving a signed read command from the BMC during the runtime of the computing device, the signed read command for reading data from a second portion of the NVRAM;

verifying the signed read command using the public key associated with the BMC; and responsive to verifying the signed read command, computing a hash of the second portion of the NVRAM, comparing the computed hash of the second portion of the NVRAM to a stored hash of the second portion of the NVRAM, and responsive to determining that the computed hash of the second portion of the NVRAM and the stored hash of the second portion of the NVRAM are the same, reading the data from the second portion of the NVRAM, generating a signed response to the read command comprising the data read from the second portion of the NVRAM, and transmitting the signed response to the read command to the BMC in reply to the signed read command.

16. The computer-implemented method of claim 15, wherein the signed response to the read command comprises a hash of the data read from the second portion of the NVRAM.

17. The computer-implemented method of claim 16, wherein the signed response to the read command is signed using a private key residing in a serial peripheral interface (SPI) controller.

18. The computer-implemented method of claim 17, wherein the signed write command and the signed response to the write command are encrypted.

19. The computer-implemented method of claim 18, wherein the signed read command and the signed response to the read command are encrypted.

* * * * *